United States Patent [19]

Shimizu et al.

[11] Patent Number: 4,578,787
[45] Date of Patent: Mar. 25, 1986

[54] RECORD DISC REPRODUCING APPARATUS

[75] Inventors: Keizo Shimizu; Shimpei Otsu, both of Yokohama; Toshio Fujimura; Yoshisada Taniguchi, both of Fujisawa; Hayashi Nagami, Yamato, all of Japan

[73] Assignee: Hitachi, Ltd., Tokyo, Japan

[21] Appl. No.: 432,803

[22] Filed: Oct. 5, 1982

[30] Foreign Application Priority Data

Oct. 5, 1981 [JP] Japan ................................ 56-157501

[51] Int. Cl.[4] ...................... G11B 19/10; G11B 17/04; G11B 1/00; G11B 25/04
[52] U.S. Cl. ..................................... 369/77.2; 369/53; 369/243; 369/258; 369/262; 369/264; 360/137
[58] Field of Search ...................... 369/77.2, 258, 262, 369/264, 243; 360/137

[56] References Cited

U.S. PATENT DOCUMENTS

| 4,380,781 | 4/1983 | Hirata | 369/77.2 |
| 4,395,744 | 7/1983 | Saito et al. | 369/77.2 |
| 4,500,983 | 2/1985 | Sugiyama et al. | 369/77.2 |
| 4,507,770 | 3/1985 | Tanaka | 369/264 |

FOREIGN PATENT DOCUMENTS

| 76518 | 4/1983 | European Pat. Off. |
| 2103863 | 2/1983 | United Kingdom . |

Primary Examiner—Steven L. Stephan
Attorney, Agent, or Firm—Antonelli, Terry & Wands

[57] ABSTRACT

A video disc player having an operational state for holding the disc without rotation when the disc has been inserted into or has been prepared for withdrawal from the player as well as a reproduction state for picking up the signal recorded on the disc when the disc is on the rotating turntable, in which the time of the holding state of the disc is measured and when the holding state of the disc exceeds a predetermined time, the disc is set on the turntable and the turntable continuously rotates until another state instruction is generated, thereby suppressing deformation of the disc.

5 Claims, 4 Drawing Figures

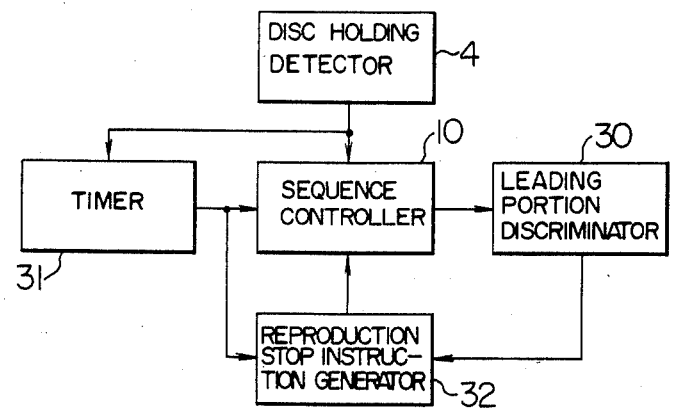
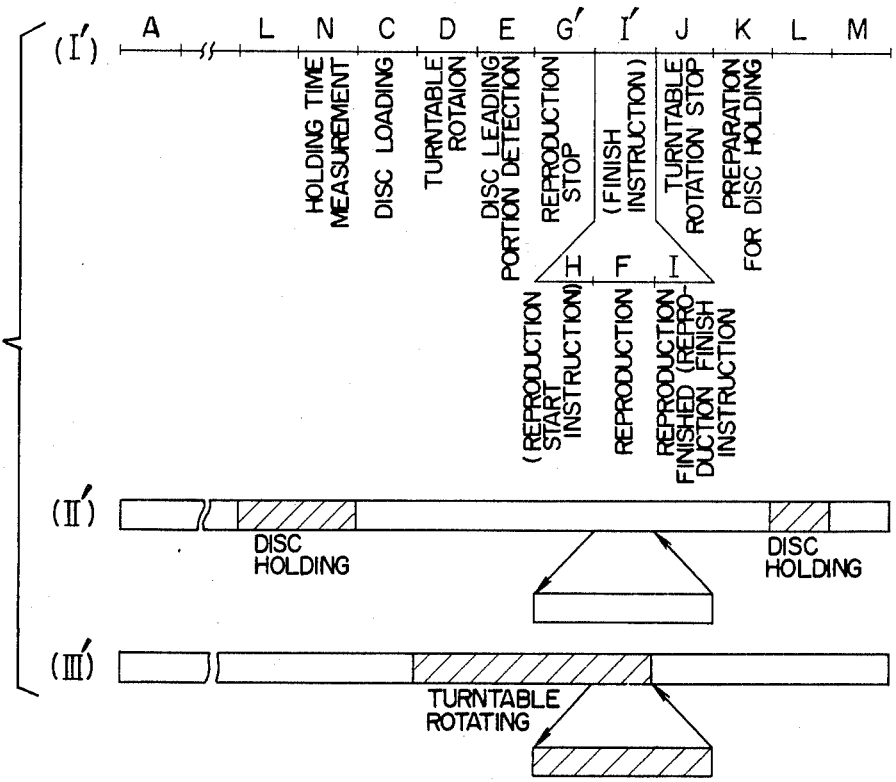

RECORD DISC REPRODUCING APPARATUS

The present invention relates to apparatuses for producing information from a record disc such as in video disc players.

Such reproducing apparatuses are generally in an almost closed structure in order to protect a record disc under a reproducing operation from foreign materials such as dust particles. Referring particularly to a video disc, it is received or stored in a protective sleeve or a caddy so that an operator does not touch the disc with his or her fingers to spoil the recorded surface of the disc. For reproduction, the disc is, being stored in the protective sleeve, inserted into an insertion slot of a video disc player, and withdrawal of the protective cover causes the video disc player to be loaded with the video disc.

Record discs such as video discs are made principally of vinyl chloride and have a poor heat-resistant capability. Since softening temperature of vinyl chloride is comparatively low, the permissible upper temperature for a video disc for the CED system is set for 45° C. Meanwhile, the reproducing apparatus is provided with an electronic circuit for processing an electric signal obtained from a record disc and the inner temperature of the apparatus may be substantially increased due to heat generated by the electronic circuit, particularly by the power supply section of the electric circuit. When the disc is placed on the turntable of the reproducing apparatus having been ready for a reproducing operation and is rotating along with the turntable, air in the vicinity of the rotating turntable and the disc is moved, thereby suppressing local temperature rise within the reproducing apparatus, and therefore the disc suffers from almost no adverse effect of the above-mentioned heat generated by the electronic circuit. However, when the disc in the reproducing apparatus having been ready for a reproducing operation is in a stand-by state for a reproduction (or a play) or for a repeated reproduction or is in a state in which the disc is prepared for a withdrawal after a play has been finished, the disc stands still, being on the turntable or being carried by a disc holder over the turntable also standing still. If, for some reason, the disc is not withdrawn or not re-played for a long time after a play of the disc has been finished or after the disc is inserted into the reproducing apparatus through the insertion slot, or if the inserted disc is not played for a long time, the disc will be left stationary (not rotated) for a long time in the above-mentioned state in the reproducing apparatus. As a result, a local temperature rise will take place in the apparatus, which may cause the temperature in the vicinity of the disc in the apparatus to exceed the permissible upper temperature for the disc.

When the disc is subjected to a temperature higher than the permissible upper temperature, it suffers from dish warp or potato chip warp or other undesirable deformation. This deformation of the disc makes it impossible for a pickup of the reproducing apparatus to properly trace the record tracks of the disc and therefore normal reproduction of information becomes impossible. Especially in an apparatus wherein the diameter of the turntable is smaller than that of the disc, deformation of the disc is more serious. For preventing such deformation, it is necessary to suppress the temperature rise by the electronic circuit. Possible countermeasures against the local temperature rise may be as follows:

(1) Installing a ventilation fan for cooling effect by the open air;
(2) Installing a circulation fan to average the local temperature rise; and
(3) Lowering the power consumption of the electronic circuit, particularly of its power supply section to limit heat generation.

The measure (1) is not suitable to a player which is intolerant of dust and also brings about an increase of cost due to provision of the ventilation fan. The measure (2) also brings about an increase of cost because of the provision of the circulation fan. The measure (3) appears the better than the others, but a certain minimum amount of electric power is needed to operate the apparatus and inclusion of a certain number of heat generating components is inevitable. Accordingly, it is almost difficult to completely prevent the above described warp or deformation by the measure (3).

An object of the present invention is to eliminate the above described disadvantage of the prior art and to provide reproducing apparatus capable of suppressing undesirable deformation of a record disc.

Another object of the present invention is to provide a disc holding apparatus for a disc player free from the drawbacks of the above prior art technique, in which deformation of the disc can be suppressed to a minimum even when a user or an operator leaves the player unoperated for a long time with the disc having been inserted into the player or being ready for withdrawal therefrom is immediately possible, and which is advantageous for manufacturing.

In order to remove the above prior art drawbacks, according to the present invention, when a disc stands still in a held state for future withdrawal or replay the duration time of the held state is measured so that when the measured time exceeds a predetermined time, the disc is moved to be set on the turntable and the turntable is rotated. As a result, air in the player is agitated to suppress the maximum value of the rising temperature and the temperature around the disc is uniformed and the radiant heat from the heat generating components is dispersed on the disc. As an additional effect of the present invention, due to the rotation of the disc, the deformation of the disc can be corrected owing to the centrifugal force.

The present invention will be apparent from the following detailed description taken in conjunction with the accompanying drawings, in which:

FIG. 3 is a block diagram of one embodiment of the present invention; and

FIG. 4 is a sequence diagram showing additional portions of the sequence of the video disc player according to one embodiment of the present invention.

Figure 1:
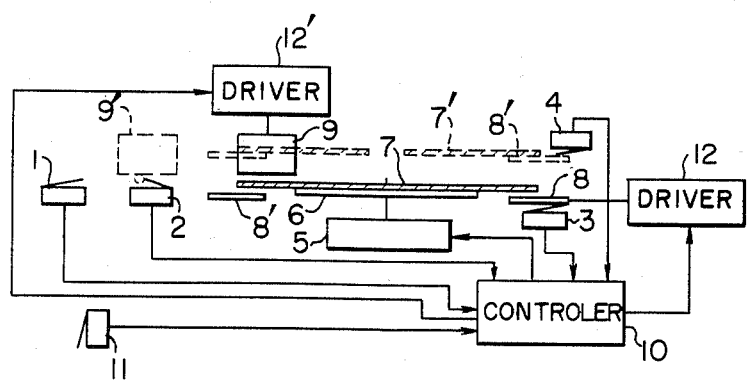
FIG. 1 is a block diagram showing a construction of a main portion of a video disc player to which the present invention may be applied.

An embodiment of the present invention will be described with reference to the drawings. A video disc player is shown in a block diagram in FIG. 1. For simplicity sake, an electronic circuit for processing an electric signal obtained from a record disc is omitted here. Reference numeral 1 designates a power switch of the player. Reference numeral 11 designates a door switch provided near the insertion slot of the player to detect opening and closing of the insertion slot (not shown). A video disc is inserted through the insertion slot into the player or is withdrawn through the insertion slot from the player when the door switch 11 as well as the power switch is actuated. Reference numeral 2 designates a stand-by switch for detecting the fact that a pickup arm 9 is in a rest portion indicated by 9'. The pickup arm 9 is moved, by a first driver 12' including a motor under the control of a controller 10, in a direction almost parallel with the surface of a turntable 6. Reference numeral 3 designates a loading switch for detecting the fact that the disc 7 is placed on the turntable 6, i.e., the turntable 6 is loaded with the disc 7. The disc is supported and carried by a disc holder 8 which is arranged to be moved, by a second driver 12 including a motor under the control of the controller 10, in a direction almost perpendicular to the surface of the turntable 6. It is clear that when the turntable 6 is loaded with the disc 7, the holder 8 is disengaged from the disc 7. Reference numeral 4 designates a disc holding detector for detecting the fact that the disc 7 has been lifted away from the turntable by the holder 8 up to a stand-by position indicated by 7', when the holder 8 is in a position indicated by 8'. Thus, switches 3 and 4 serve as senser means for detecting the position of the disc. The turntable is rotated by a disc drive motor 5 controlled by the controller 10. As can be understood from the above description, the disc and the disc holder as indicated by 7 and 8 are in a state in which a disc loading has been finished with the pickup arm being in position 9, while the disc and the disc holder as indicated by 7' and 8' are in a state in which a disc unloading has been finished or the disc has just been inserted through the disc insertion slot into the apparatus with the pickup arm being in position 9'.

Figure 2:
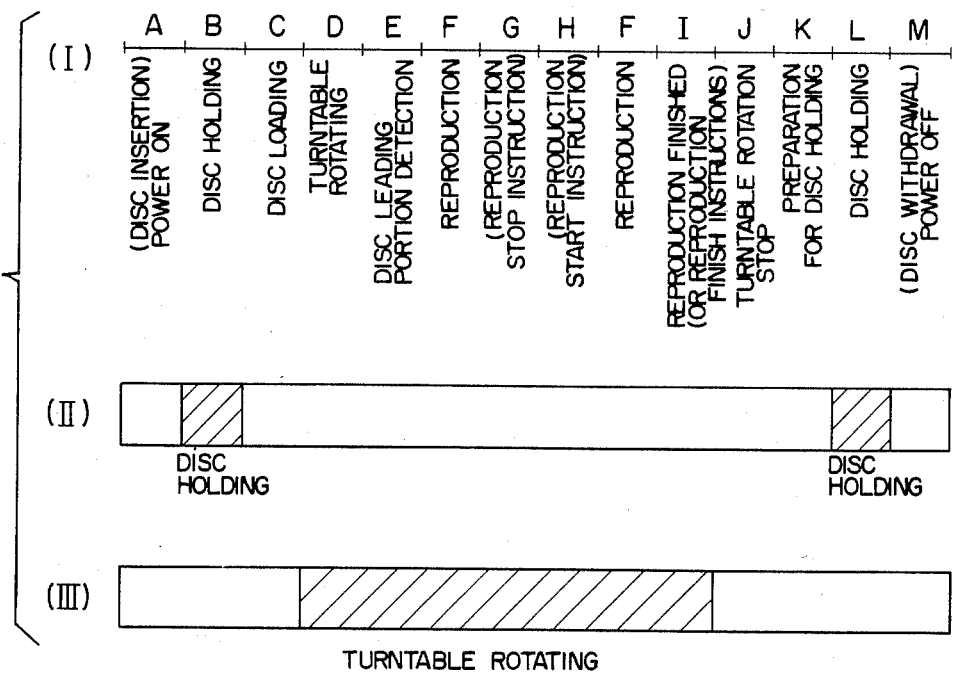
FIG. 2 shows a sequence and states of some portions of the conventional video disc player.

FIG. 2 is a sequence diagram showing a series of operational steps of a conventional video disc player between insertion of a caddy containing a disc into the player and withdrawal of the caddy with the disc returned thereinto after a reproduction of the disc. In (I) of FIG. 2, there are shown reference letters representing the respective steps of the sequence and operating states of the player at these steps. In (II) of FIG. 2, hatched portions show a disc holding state in which the disc is left in the player but is not on the turntable. The hatched portion in (III) of FIG. 2 shows a turntable rotating state. In FIG. 2, the horizontal direction represents a time axis which is common to (I), (II) and (III). In FIG. 2, (I), the steps A, G, H, I and M for the operating states put in parentheses are operations by the operator. The steps A and M of them are indespensable operations. Other steps except these five steps do not need operator's operation since the sequence controller 10 controls the sequence so that steps are automatically continued. As it will be clear from (I), (II) and (III) of FIG. 2, it is in the case of the disc holding state (step L) only that the disc is left in the holding state in the player for a long time with the player being powered due to an eroneous operation or an inadvertent maintenance of nonactivation of the player by the operator. The other disc holding state (step B) must be immediately followed by the next disc loading state (step C) and consequently there is no fear that the disc is deformed.

As a result of various experiments, it has been revealed that deformation of the disc equal to or more than 0.5 mm does not occur even after a reproduction state (step F) is continued for 300 to 500 hours, while such deformation occurs if the disc holding state (step L) is continued for 10 to 24 hours. According to the present invention, when the step L lasts for a long time, the duration of the step L is interrupted to suppress possible deformation of the disc.

FIG. 3 is a block diagram of the main portion showing one embodiment of the present invention. In FIG. 3, numeral 10 designates a sequence controller, 4 a disc holding detector, and 30 a leading portion discriminator for searching the leading portion of information recorded on the disc. Numeral 31 designates a timer and 32 a reproduction stop instruction generator.

In this embodiment, in order to add new steps which are not included in the sequence shown in FIG. 2, there are provided the timer 31 and the reproduction stop instruction generator 32. The timer 31 continuously measures the time while an input signal is being supplied from the disc holding detector 4, so that if the input is continued to be supplied to the detector 4 for a time (for example 2 minutes) which corresponds to a time long enough for the operator to pull out the disc along with the caddy containing the disc after a reproduction or a play of the disc has been finished, the timer 31 delivers an output to the sequence controller 10 and to the reproduction stop instruction generator 32. The controller 10, responsive to the output from the timer 10, serves to effect a disc loading. In this embodiment, for this purpose, a disc reproduction instruction of the sequence controller 10 is utilized. If the input to the timer 31 from the disc holding detector 4 stops, the timer 31 is reset.

The output signals of the timer 31 and the leading portion discriminator 30 are supplied to the reproduction stop instruction generator 32 in order that when the lead-in operation for searching the leading portion of the recorded information is completed, a reproduction stop instruction is applied to the system controller 10.

FIG. 4 shows a sequence chart of the player according to the present invention. (I)', (II)' and (III)' shown in FIG. 4 show the sequence, the disc holding state and the turntable rotating state in the case where the step L lasts for a long time, respectively corresponding to (I), (II) and (III) shown in FIG. 2. In FIG. 4, same letters as those used in FIG. 2 designate similar steps or states.

If the disc holding state (step L) is left as it is selected, the disc holding detector 4 and the timer 31 in combination command the sequence controller 10 to achieve the operations following the step C.

At this time, the output signal of the timer 31 is also supplied to the reproduction stop instruction generator 32. The player performs the ordinary operations following the step C shown in FIG. 4. However, the instant the disc lead-in operation is completed, since the output signal of the leading portion discriminator 30 is supplied to the reproduction stop instruction generator 32, the reproduction stop instruction generator 32 applies the reproduction stop instruction to the sequence controller 10. Thereby, the operation of the leading portion discriminator 30 is stopped and the sequence followed becomes the same as the reproduction stop sequence.

After that, there are considered two cases. One is that a reproduction finish instruction is applied by the operator and the other is that a reproduction start instruction is applied by the operator.

As shown by the sequence chart in FIG. 4, if there is a reproduction finish instruction (step I') of the operator, it is followed by the same operations as the steps J, K and L shown in FIG. 2. On the other hand, if the operator generates a reproduction start instruction, the reproduction operation (step F) is performed and then the operation is followed by the steps J, K and L in the same manner as above through a finish of the reproduction (reproduction finish instruction) (step I).

As described above, according to the present invention, only a small scale circuit modification is necessary of the conventional video disc player to automatically limit a long duration of the disc holding state (step L) in which the disc may be deformed, thereby suppressing deformation of the disc.

Furthermore, as described above, according to the present invention, the maximum temperature in the player is reduced (about by 3 degrees) and the nonuniformity of the temperature around the disc is suppressed (difference of the temperature is about 6 degrees), the radiant heat from the heat generating components is reduced (about to one quarter), and disc deformation is corrected due to the centrifugal force (the deformation is corrected by one tenth), thereby reducing deformation of the disc to about one third to one quarter without degrading the operativity in the prior art for inserting and withdrawing the disc even when the disc holding state is continued for a long time.

We claim:

1. An apparatus for reproducing information from a record disc, the apparatus having an operational state in which the disc is held without rotation when the disc has been inserted into or has been prepared for withdrawal from the apparatus as well as a reproduction state in which signals recorded on the disc are picked up from the disc when the disc is on a rotating turntable of the apparatus, the apparatus comprising means for measuring the time of the operational state in which the disc is held without rotation, means for comparing the measured time with a predetermined time value, means for producing a first control signal for setting the disc on the turntable when the measured time becomes equal to the predetermined time value, and means for producing a second control signal for rotation of the turntable, thereby suppressing deformation of the disc.

2. A disc player having a reproduction state in which an information recording disc is set on a turntable for rotating the disc in the player and a holding state for holding the disc without rotation while the disc is separated from the turntable, the reproduction state including a first state in which pick up means for picking up information recorded on the disc searches a leading portion of the information on the disc and a second state for enabling reading of the information from the leading portion of the disc for reproduction, the disc player comprising:

first detecting means for detecting that said holding state of the disc player continues for at least a predetermined time and for producing a first detection signal;

second detecting means for detecting completion of said first state and for producing a second detection signal; and control means for generating a control signal for controlling the disc player to be in said first state in response to said first detection signal and to be in said holding state in response to said second detection signal.

3. An apparatus for reproducing information from a record disc wherein the apparatus includes a holding state in which the record disc disposed within the apparatus is held without rotation and a reproducing state in which information recorded on the disc is picked up from the disc when the disc is on a rotating turntable, the apparatus comprising means for suppressing deformation of the disc due to heat generated within the apparatus, the deformation suppressing means including means for measuring the length of time of the holding state in which the disc is held without rotation, means for comparing the measured time with a predetermined time value, and means for effecting rotation of the disc when the measured time becomes equal to the predetermined time value so as to suppress a heat buildup within the apparatus and thereby suppress deformation of the disc.

4. An apparatus according to claim 3, further comprising a turntable on which the disc is disposed for rotation, the means for effecting rotation of the disc including first means for producing a first control signal for mounting the disc on the turntable in response to the measured time becoming equal to the predetermined time value, and second means for producing a second control signal for effecting rotation of the turntable and the disc mounted thereon.

5. An apparatus according to claim 4, wherein the reproducing state of the apparatus includes a first state in which pickup means for picking up information recorded on the disc searches a leading portion of the information on the disc and a second state for enabling reading of the information from the leading portion of the disc for reproduction, the means for producing the second control signal for rotation of the disc after production of the first control signal enabling the first state of the reproducing state, and detecting means for detecting completion of the first state of the reproducing state and for producing a detection signal in accordance therewith, and control means for controlling the apparatus to be in the holding state in response to the detection signal.

* * * * *